July 20, 1926.

T. HEAVEN

FLORAL DECORATION

Filed Feb. 28, 1924

1,593,450

INVENTOR.
Thomas Heaven.
BY
ATTORNEYS.

Patented July 20, 1926.

1,593,450

UNITED STATES PATENT OFFICE.

THOMAS HEAVEN, OF BENTON HARBOR, MICHIGAN.

FLORAL DECORATION.

Application filed February 28, 1924. Serial No. 695,664.

This invention relates to a mounting designed for use in connection with the building up of wreaths, sprays, or other set pieces required for floral display.

The object of the invention is to improve the holding capacity for the mounting, to reduce its liability to disintegrate after moderate usage, and to reduce the cost of manufacture thereof.

In the making of floral backings, of the kind now commonly employed, it is customary to build up such backings out of moss, which is formed into the desired shape and covered with tissue paper bound around with a wrapping wire or cord. In use, the flowers, usually mounted upon tooth picks, are positioned upon the backing by piercing the covering thereof and forcing the tooth picks into the moss body of the backing.

I have discovered that a backing made of bulrush stalks bound together by a suitable wrapping or binding, and built or bent to the desired shape, affords a backing which is much superior to those of the character now in use.

The bulrush stalks comprise an outer sheath or covering of rather close and coherent texture, which surrounds a cellular or spongy body which affords a highly satisfactory medium into which to force the tooth picks upon which the flowers are mounted. The skin or covering of the stalk prevents any of the interior cellular structure from escaping or disintegrating, and the cellular body, while permitting the tooth picks to be easily forced into place, affords a resistant medium against their accidental withdrawal or displacement. At the same time the material in dried form can be very easily obtained, and readily lends itself to being built up or bent to the desired shape.

In the drawings:

Figure 1 displays a backing of the present invention in the form of a ring designed as a foundation for a wreath, with several flowers entered therein;

Fig. 3 is a straight section of the present material in form to furnish a foundation for a spray or the like.

Figure 1:
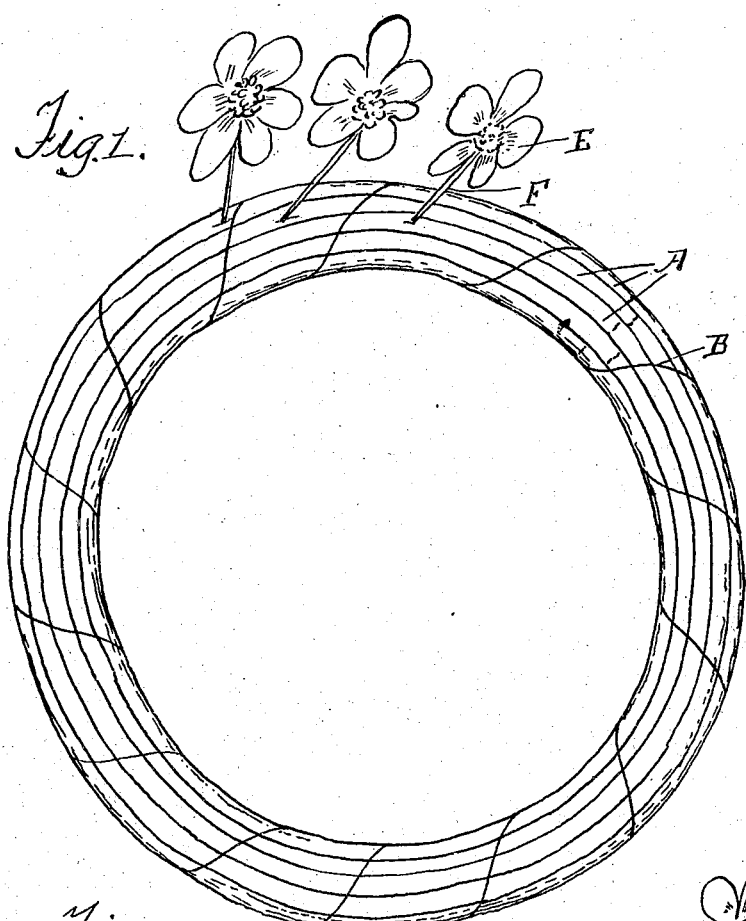
Figure 2:
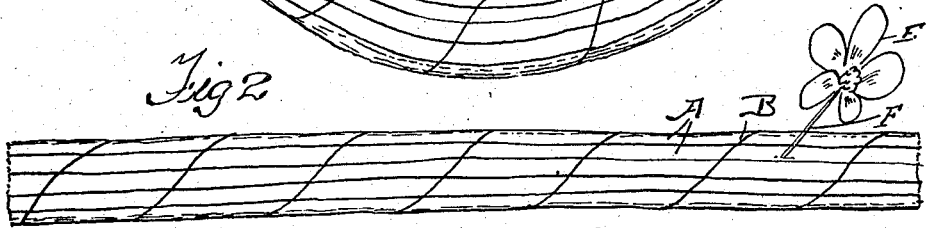
Fig. 2 is a cross sectional view of the same.
Figure 3:
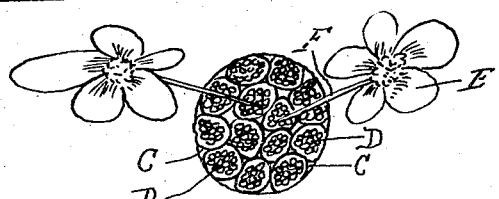

The backing of the present invention comprises a plurality of stalks A, preferably the stalks of bulrushes, which are formed into a bundle and bound around with a wrapping twine or wire B. Each of the stalks comprises a skin or covering C, and a cellular body D. The backing furnishes a mounting for a plurality of flowers or floral decorations E, each of which is preferably mounted upon a stiff stem or pin F, tooth picks being commonly used for this purpose.

Although the invention contemplates the use of bulrush stalks for the purposes stated, it is not the intention, unless otherwise specified, to limit the claims, since the stalks of other plants having similar structural characteristics might be similarly employed.

It is preferred to employ the stalks in their dry condition, since in this form they are impervious to rotting or disintegration.

I claim:

1. A backing for floral decorations, consisting of a bundle of stalks each comprising a cellular body and a closely formed skin, wrapping means for holding said stalks in bundled relation, and a plurality of floral decorations having stiff stems, the stems being inserted into the backing, substantially a described.

2. A floral decoration consisting of a backing formed of a bundle of dried bulrush stalks, each stalk comprising an outer skin and a cellular body, a binding strand wound around the backing to maintain the stalks in bundled condition, and a plurality of floral decorations each mounted upon a stiff stem, the stems being inserted into the backing, substantially as described.

THOMAS HEAVEN.